United States Patent Office 3,143,424
Patented Aug. 4, 1964

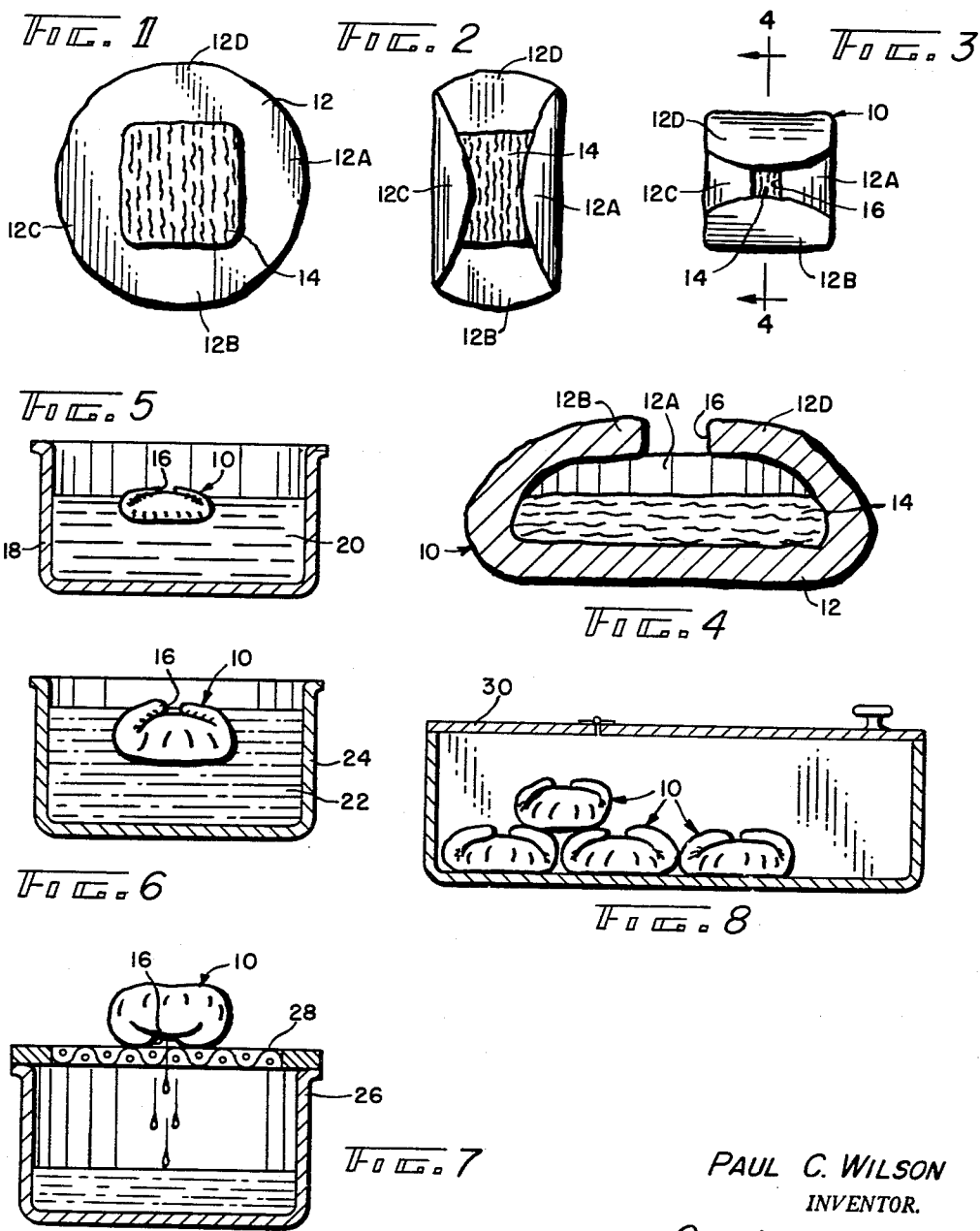

3,143,424
METHOD FOR MAKING A FRIED SANDWICH
Paul C. Wilson, 146 Main St., Carthage, Ill.
Filed Dec. 6, 1961, Ser. No. 157,482
4 Claims. (Cl. 99—1)

The present invention generally relates to a food product and to a method of preparing the same for human consumption. More particularly, my invention pertains to a novel form of prefabricated sandwich adapted for cooking in a heated liquid medium, such as grease or oil.

The broad objection of this invention is to provide a sandwich encased in freshly made bread, said sandwich being characterized by ease of preparation, low cost, pleasing appearance and outstanding delectability.

Another object is to provide a sandwich of the aforesaid character wherein the sandwich casing comprises yeast rising dough which is proofed and cooked subsequent to fabrication of the sandwich and preferably just prior to consumption.

Yet another object is the provision of a novel method of preparation for a prefabricated sandwich having a casing of yeast rising dough; said method including the step of subjecting the sandwich structure to heated water to rapidly proof the dough, to soften and tenderize the dough, and to initiate cooking of the sandwich filler.

Still another object is to provide a method for cooking a dough casing for a sandwhich of the aforedescribed type which permits the casing to be compounded with little or no shortening, thereby reducing the caloric content of the finished product.

A more specific object is to provide a prefabricated sandwich structure including a dough casing having means therein for communicating excess grease generated by cooking a meat filler to the exterior of the casing, thereby permitting recovery of the grease and eliminating the need for compounding special grease absorbing agents in the casing dough.

These and other objects and advantages will appear upon reading the following specification and claims and upon considering in connection therewith the attached drawing to which they relate.

In the drawing:

FIGS. 1, 2 and 3 are top plan views showing progressive steps in the fabrication of a sandwich constructed in accordance with my invention;

FIG. 4 is an enlarged sectional view taken along lines 4—4 of FIG. 3;

FIGS. 5, 6 and 7 are diagrammatic showings of means suitable for use in my novel method of preparing the sandwich illustrated in FIGS. 1–4; and, FIG. 8 is a diagrammatic showing of a heated storage means for sandwiches processed according to my invention.

An exemplary embodiment of my invention comprises the sandwich structure generally indicated in the drawings by numeral 10. The sandwich 10 includes an edible dough wrapper or casing 12 and a filler 14.

The casing 12 preferably is made of bread dough which may be compounded from mashed potatoes, wheat flour, little or no shortening, and yeast. Upon proper baking or cooking, according to a method to be hereinafter described, the freshly made bread wrapper may be served while it is warm thereby greatly enhancing the tastiness of the finished sandwhich. While I prefer to compound the casing 12 from the above noted ingredients, I do not intend to limit the present invention to a particular type of bread dough; the only requirement being that the dough is a yeast rising dough which will provide a soft, light and relatively thick casing for a selected filler. While other types of sandwich casing have been compounded in batter form or from non-raising dough, these products do not conform to the American public's taste for fresh bread-type sandwich buns.

In the drawings, the filler 14 is shown as a formed patty of food substance and, for purposes of description only, will be assumed to comprise uncooked hamburger. However, the filler may comprise any desirable food substance commonly served as a sandwich filler; moreover, the filler may be cooked, partially cooked, or uncooked at the time the sandwich is fabricated.

FIGS. 1–3 of the drawings illustrate one method of manually fabricating the illustrative embodiment of my novel sandwich and show a generally circular body of rolled-out dough 12 having a generally square patty of hamburger filler 14 disposed centrally of the dough. The dough is rolled out by any suitable means and is provided with portions 12a–12d which extend laterally beyond the marginal edges of the filler 14, for a purpose to be described. In order that the finished sandwich size approximate that of conventional hamburger sandwiches, I prefer to roll a predetermined quantity of dough to a diameter of five inches and a thickness of three-eighths of an inch. The hamburger filler 14 is about two and one-quarter inches square and three-eighths inch thick. After the filler is placed upon the dough, as shown in FIG. 1, oppositely extending portions of the rolled dough are folded upwardly and inwardly to substantially encase the filler. In FIG. 2, extending portions 12a and 12c have been folded in place; and, this operation is followed by folding the remaining portions 12b and 12d, in the manner shown in FIG. 3, to complete the sandwich fabrication. If so desired, the portions 12a–12d may be folded in random order. After the portions 12a–12d are folded in place, it may be desirable to press the top of the structure to produce cohesion of the folded dough portions.

An important aspect of my invention is the provision of an opening 16 through the dough casing 12 to the filler 14. The desirability of such an opening will become abundantly clear upon consideration of the hereinafter described method of preparing the sandwich 10. As seen in FIGS. 3 and 4, the opening 16 is defined by the marginal edges of folded portions 12a–12d and communicates directly from a surface of the hamburger filler 14 to the exterior of the dough casing 12. For purposes of illustration, the size of opening 16 has been greatly exaggerated; and, in practice, I prefer that the opening in the uncooked dough be just large enough to prevent complete closure thereof during the subsequent preparation of the sandwich.

While I have described a sandwich structure which is particularly formed and dimensioned to accommodate a hamburger patty, it is to be understood that the shape and size of the casing structure is infinitely variable in order to employ any desirable shape or quantity of filler material; the only requirement being that the casing 12 include an opening therefrom similar to the aforedescribed opening 16. From the foregoing description it will be appreciated that the manual fabrication of my sandwich may be accomplished by a small number of simple movements; therefore the described structure lends itself to fabrication by commercially available mechanical means.

An important feature of this invention is the provision of a novel method for preparing a sandwich of the hereinbefore described type. Essentially, this process involves the steps necessary to proof the yeast rising dough of casing 12, to cook the casing 12 and the filler 14, if the filler is to be cooked, to remove excess cooking grease and/or fryings from the casing 12, and to maintain the cooked sandwhich in its most palatable condition until it is served for consumption.

I prefer to accomplish the above-enumerated steps in the following manner: First, the sandwich is fabricated or, if previously made up, is supplied directly from a refrigerated storage area and is subjected to a bath of heated water to proof the dough casing 12. FIG. 5 illustrates a closed container 18 for a quantity of water 20 which is heated by any suitable means (not shown). The precise temperature of the water will necessarily be determined by the selected composition of the casing; however, in all cases the temperature should be great enough to produce rapid and substantially complete proofing of the dough without damaging the living yeast cells. In a dough comprising a substantial percentage of mashed potatoes, I have found that the desired results can be accomplished by subjecting the sandwich to water heated to about 118° Fahrenheit for approximately two minutes. After proper proofing, the casing will be somewhat thicker than before as is indicated by a comparison of FIGS. 5 and 6 which show respectively the size of the sandwich at the beginning of the proofing operation and at the beginning of the next succeeding step. As the dough expands in response to the raising action of the yeast, the aforementioned opening 16 in case 14 will close somewhat, but never entirely. Thus the heated proofing water 20 may enter opening 16 and contact the meat filler 14, thereby producing some precooking and tenderization of the filler. Furthermore, directly contacting the uncooked dough with water substantially softens and tenderizes the dough. For this reason, I have discovered that little or no shortening need be compounded in the dough mixture. This reduction or elimination of shortening in the dough correspondingly reduces the caloric content of the finished product. However, the primary advantage derivable from water proofing the casing 14 is that this procedure makes the prefabrication of a yeast dough sandwich casing practical for the first time. Conventional proofing techniques require substantially more time and thereby involve risk of spoilage of the filler material and decrease the speed with which the end product may be freshly served. Furthermore, floating the sandwich in proofing water prevents compacting of the bottom portion of the soft dough casing and permits uniform and complete raising action, a result which is unattainable by conventional proofing methods which require that the body of dough be rigidly supported.

Following proofing of the dough casing, the sandwich 10 is immediately subjected to a cooking operation in a heated fluid cooking medium, such as grease or oil. In FIG. 6, the sandwich is shown substantially submerged in a quantity of cooking medium 22 disposed in a container 24 which is heated by any desired means. Upon contacting the hot cooking medium, the exterior of casing 12 is quickly cooked and forms a golden brown crust. This crust prevents undesirable absorption of cooking medium by the exterior of the casing 12. The crust also seals in the moisture imparted into the dough during the proofing step, thereby giving the cooked dough a highly desirable texture. In order to rapidly and uniformly cook the casing 12 and the uncooked hamburger filler 14, I prefer that the cooking medium be maintained about 375° Fahrenheit. Under usual conditions, the exemplary sandwich will be uniformly cooked in about two minutes, however, cooking time may vary according to the size of the sandwich, the cooking temperature, the type of filler employed and its condition, and according to individual taste. During the cooking operation, the hamburger filler 14 is contacted by cooking medium entering through opening 16 in casing 12. Thus the provision of the opening insures adequate cooking of the central portion of the filler. If the filler comprises a grease producing substance, the grease or fryings generated by the filler during cooking may be expelled through the opening 16 thereby avoiding excessive and undesirable internal absorption of these fryings by the casing.

After cooking the sandwich in container 24, any remaining cooking medium and meat fryings from filler 14 are drained from the interior of the sandwich to prevent their being absorbed by casing 12 or filler 14. For this purpose, I provide a suitably constructed draining means comprising a container 26 and an overlying screen 28 or an equivalent perforate structure. In the draining process, the cooked sandwich 10 is supported upon the screen 28 with the opening 16 facing downwardly so that the unwanted cooking medium and fryings are drawn by gravity from the interior of the sandwich and deposited in the container 26. This step in my method not only enhances the tastiness and digestability of the end product, but also provides a significant amount of drained cooking medium and fryings to be returned to the cooking container 24, thereby effecting a real economy in the cooking operation. Furthermore, the need for inclusion of special grease absorbing ingredients in the dough mixture is eliminated.

Where my method is used in a commercial operation requiring that a supply of finished sandwiches be kept on hand to meet varying demands, I employ the additional step of maintaining the cooked and drained sandwiches in a warm storage area, such as the enclosed structure 30, shown in FIG. 8. Such storage of the finished product serves to preserve its delectability and freshness until it is served for consumption.

For the purposes of illustration, the apparatus for carrying out the above-described steps of my method is shown in very simple form. However, in a commercial application of this method, the apparatus might embody an automatic, continuous flow means for processing great numbers of sandwiches simultaneously. Moreover, certain steps of the method, such as draining and storing the cooked product, might be combined. Nevertheless, it will be appreciated that the disclosed sandwich and method of rapidly preparing the same is particularly well suited for automatic, mass production of this type of food product.

It will be understood that the above description and accompanying drawings comprehend only a general and preferred embodiment of my invention and that various changes in construction, proportion and arrangement of the sandwich structure and in the details and sequence of the method may be made without sacrificing any of the above-enumerated advantages or departing from the scope of the appended claims.

Having fully disclosed my invention, what I claim as new and useful and desire to protect by United States Letters Patent is:

1. A method for preparing an edible food article comprising the following steps:
providing a meat body and a quantity of bread dough compounded with yeast for effecting raising of said dough upon heating thereof;
fabricating a sandwich structure by substantially surrounding said meat body in said dough;
floating said sandwich structure in water heated to a temperature effective for rapidly proofing said dough, but below a temperature destructive of the yeast in said dough; and
cooking said meat body and said dough by means of a deep frying operation whereby said meat body is substantially encased in freshly made bread.

2. The method according to claim 1 wherein, the proofing step is carried out by subjecting said sandwich structure to heated water at approximately 118° Fahrenheit for approximately two minutes whereby said dough is fully proofed and said meat body is partially cooked; and, the cooking step is begun immediately after completion of the proofing step and comprises subjecting said sandwich structure to cooking oil at approximately 375° Fahrenheit until said meat body and said dough are uniformly cooked throughout.

3. The method according to claim 1 wherein the fabricating step is completed in such a manner that the dough defines an opening therethrough whereby proofing water may directly contact said meat body to effect partial cooking thereof during the proofing step.

4. The method for preparing a sandwich comprising the following steps:
   providing a flattened body of yeast rising bread dough;
   placing a meat body upon said dough and folding extending portions of the same to substantially encase said meat body, but leaving an opening through said dough to said meat body;
   floating the dough encased meat body in heated water having a temperature below that destructive of the yeast cells in said dough to rapidly proof said dough, said heated water entering said opening during the proofing step to partially cook said meat body;
   immediately transferring the dough encased meat body to heated cooking grease to cook said meat body and said dough throughout; and
   draining cooking grease and meat fryings from said meat body through said opening after completion of the cooking operation.

References Cited in the file of this patent

UNITED STATES PATENTS

| | | |
|---|---|---|
| 1,591,945 | Sawkins | July 2, 1926 |
| 1,596,652 | Giovannetti | Aug. 17, 1926 |
| 1,875,277 | Sweeney | Aug. 30, 1932 |
| 2,780,181 | Roman et al. | Feb. 5, 1957 |
| 2,855,305 | Cella | Oct. 5, 1958 |
| 2,950,978 | Milani | Aug. 30, 1960 |

OTHER REFERENCES

"Food Industries," July 1949, pp. 62 and 63.
"Baking Industry," March 8, 1958, page 74.
"Jewish Cookery," 1949, Leonard, Crown Publishers (New York), page 104.